United States Patent
Huang et al.

(10) Patent No.: US 11,147,132 B2
(45) Date of Patent: Oct. 12, 2021

(54) SWITCHING CONVERTER, CONTROL CIRCUIT AND CONTROL METHOD THEREOF

(71) Applicant: Silergy Semiconductor Technology (Hangzhou) LTD, Hangzhou (CN)

(72) Inventors: Fusong Huang, Hangzhou (CN); Kailang Hang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 31 days.

(21) Appl. No.: 16/564,091

(22) Filed: Sep. 9, 2019

(65) Prior Publication Data

US 2020/0100339 A1    Mar. 26, 2020

(30) Foreign Application Priority Data

Sep. 20, 2018   (CN) .......................... 201811101457.6

(51) Int. Cl.
*H05B 45/10* (2020.01)
*H05B 45/44* (2020.01)
*H05B 45/37* (2020.01)

(52) U.S. Cl.
CPC ............. *H05B 45/10* (2020.01); *H05B 45/37* (2020.01); *H05B 45/44* (2020.01)

(58) Field of Classification Search
CPC ........ H05B 45/10; H05B 45/44; H05B 45/37; Y02B 70/10; H02M 2001/0025; H02M 2003/1586; H02M 2001/0032; H02M 3/1584; H02M 1/088

See application file for complete search history.

(56) References Cited

U.S. PATENT DOCUMENTS

| | | | |
|---|---|---|---|
| 6,268,716 B1 * | 7/2001 | Burstein | H02M 3/157 323/272 |
| 8,581,518 B2 | 11/2013 | Kuang et al. | |
| 8,710,810 B1 * | 4/2014 | McJimsey | H02M 3/157 323/272 |
| 2009/0153110 A1 * | 6/2009 | Huang | H02J 1/102 323/271 |
| 2010/0066319 A1 * | 3/2010 | Qiu | H02M 3/1584 323/272 |
| 2011/0127925 A1 | 6/2011 | Huang et al. | |
| 2012/0262136 A1 * | 10/2012 | Nien | H02M 3/1584 323/272 |
| 2013/0307503 A1 | 11/2013 | Ouyang et al. | |
| 2016/0261188 A1 * | 9/2016 | Wang | H02M 3/1584 |
| 2017/0318639 A1 | 11/2017 | Wang et al. | |
| 2018/0191251 A1 * | 7/2018 | Tao | H02M 1/08 |
| 2018/0295685 A1 | 10/2018 | Wang et al. | |
| 2018/0295690 A1 | 10/2018 | Chen et al. | |
| 2018/0310376 A1 | 10/2018 | Huang et al. | |

* cited by examiner

*Primary Examiner* — Renan Luque

(57) ABSTRACT

A method of controlling a switching converter having a plurality of interleaved parallel branches, can include controlling conduction phases of power switches of the plurality of interleaved parallel branches to be overlapped when a load changes from a light load to a heavy load, in order to improve dynamic response performance of the switching converter. A control circuit for a switching converter with a plurality of interleaved parallel branches, can control conduction phases of power switches of the interleaved parallel branches to be overlapped when a load changes from a light load to a heavy load, in order to improve dynamic response performance of the switching converter.

16 Claims, 13 Drawing Sheets

SWITCHING CONVERTER, CONTROL CIRCUIT AND CONTROL METHOD THEREOF

RELATED APPLICATIONS

This application claims the benefit of Chinese Patent Application No. 201811101457.6, filed on Sep. 20, 2018, which is incorporated herein by reference in its entirety.

FIELD OF THE INVENTION

The present invention generally relates to the field of power electronics, and more particularly to switching converters, and associated control circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A switching converter may utilize a plurality of branches interleaved in parallel, in order to reduce the withstand stress of the power device, increase the power density of the power supply, reduce the ripple of the output voltage, and generate a high-quality output voltage. Each branch can include a power switch, a rectifier switch, and a corresponding energy storage element. The branches may be referred to as interleaved parallel branches of the switching converter. Since the switching converter may switch between no-load, light-load, and heavy-load modes, the dynamic response performance of the switching converter with multi-phase interleaved parallel branches is a strong consideration in converter design.

In one embodiment, a method of controlling a switching converter having a plurality of interleaved parallel branches, can include controlling conduction phases of power switches of the plurality of interleaved parallel branches to be overlapped when a load changes from a light load to a heavy load, in order to improve dynamic response performance of the switching converter. In one embodiment, a control circuit for a switching converter with a plurality of interleaved parallel branches, can control conduction phases of power switches of the interleaved parallel branches to be overlapped when a load changes from a light load to a heavy load, in order to improve dynamic response performance of the switching converter.

Figure 1:
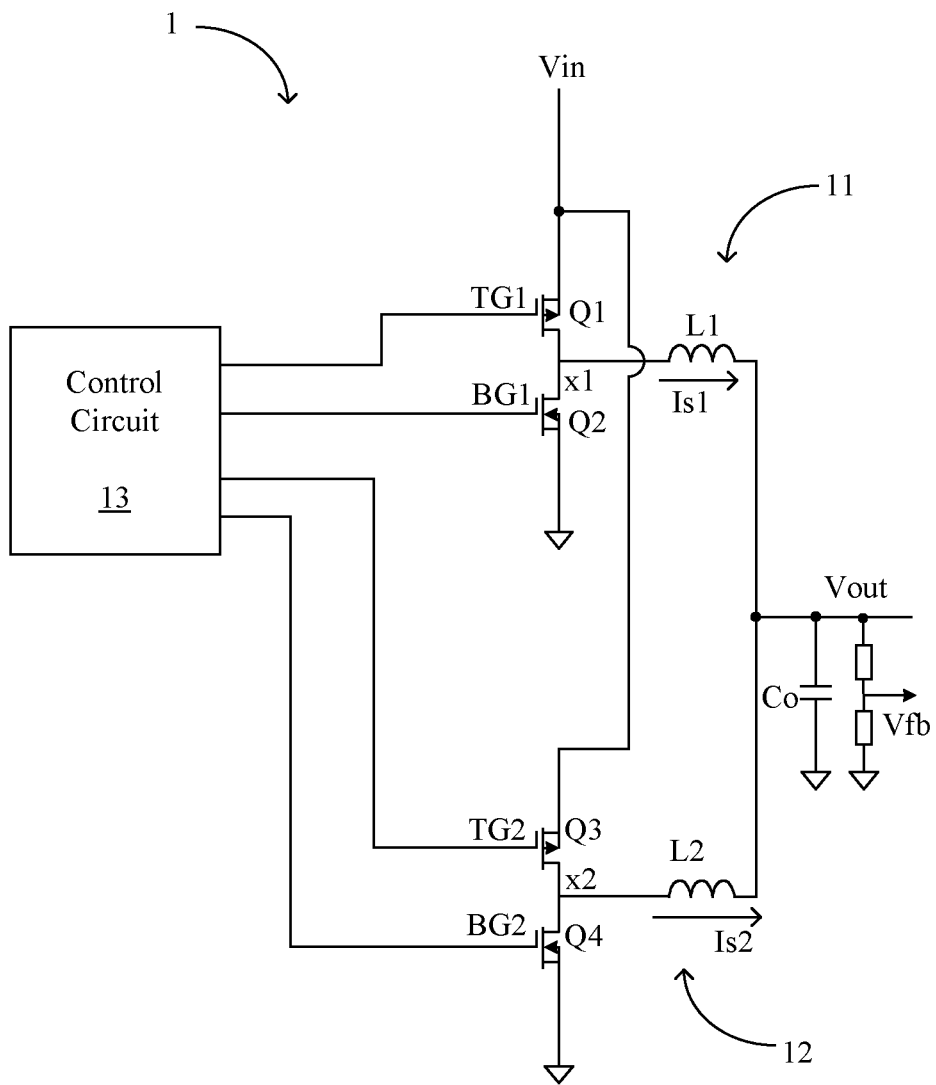
FIG. 1 is a schematic circuit diagram of an example switching converter, in accordance with embodiments of the present invention.

Referring now to FIG. 1, shown is a schematic circuit diagram of an example switching converter, in accordance with embodiments of the present invention. In this example, switching converter 1 can include master interleaved parallel branch 11, slave interleaved parallel branch 12, control circuit 13, and output capacitor Co. For example, master interleaved parallel branch 11 and slave interleaved parallel branch 12 may both be buck converter topologies. It should be understood that master interleaved parallel branch 11 and slave interleaved parallel branch 12 can be other topologies (e.g., boost, buck-boost, etc.). Also, in this example, only one slave interleaved parallel branch is arranged as an example, but two or more slave interleaved parallel branches may be provided as needed in other applications. Master interleaved parallel branch 11 can include power switch Q1, rectifier switch Q2, and inductor L1. Slave interleaved parallel branch 12 can include power switch Q3, rectifier switch Q4, and inductor L2. Also, power switch Q1 and rectifier switch Q2 can connect between an input terminal of switching converter 1 and ground, and inductor L1 can connect between a common coupling point of power switch Q1 and rectifier switch Q2 (e.g., intermediate node x1 of master interleaved parallel branch 11) and an output terminal of switching converter 1.

Power switch Q3 and rectifier switch Q4 can connect between the input terminal of switching converter 1 and ground, and inductor L2 can connect between a common coupling point of power switch Q3 and rectifier switch Q4 (e.g., intermediate node x2 of slave interleaved parallel branch 12) and the output terminal of switching converter 1. According to the interleaved parallel operation principle of the switching converter, when the switching converter operates in a steady state, power switch Q1 and power switch Q3 may be turned on with a phase shift, and the ripples of the current flowing through inductors L1 and L2 can cancel each other out, such that the current ripple of the output current and the voltage ripple of the output voltage can be greatly reduced. For example, power switch Q1 and power switch Q3 may be turned on with a phase shift of 180°.

In this example, control circuit 13 can control the conduction phases of the power switches of the interleaved parallel branches to be overlapped when the load changes from the light load to the heavy load, in order to improve the dynamic response performance of the system and to control the conduction phases of the power switches of the interleaved parallel branches not to be overlapped when the switching converter operates in the steady state, in order to reduce the ripple.

Figure 2:
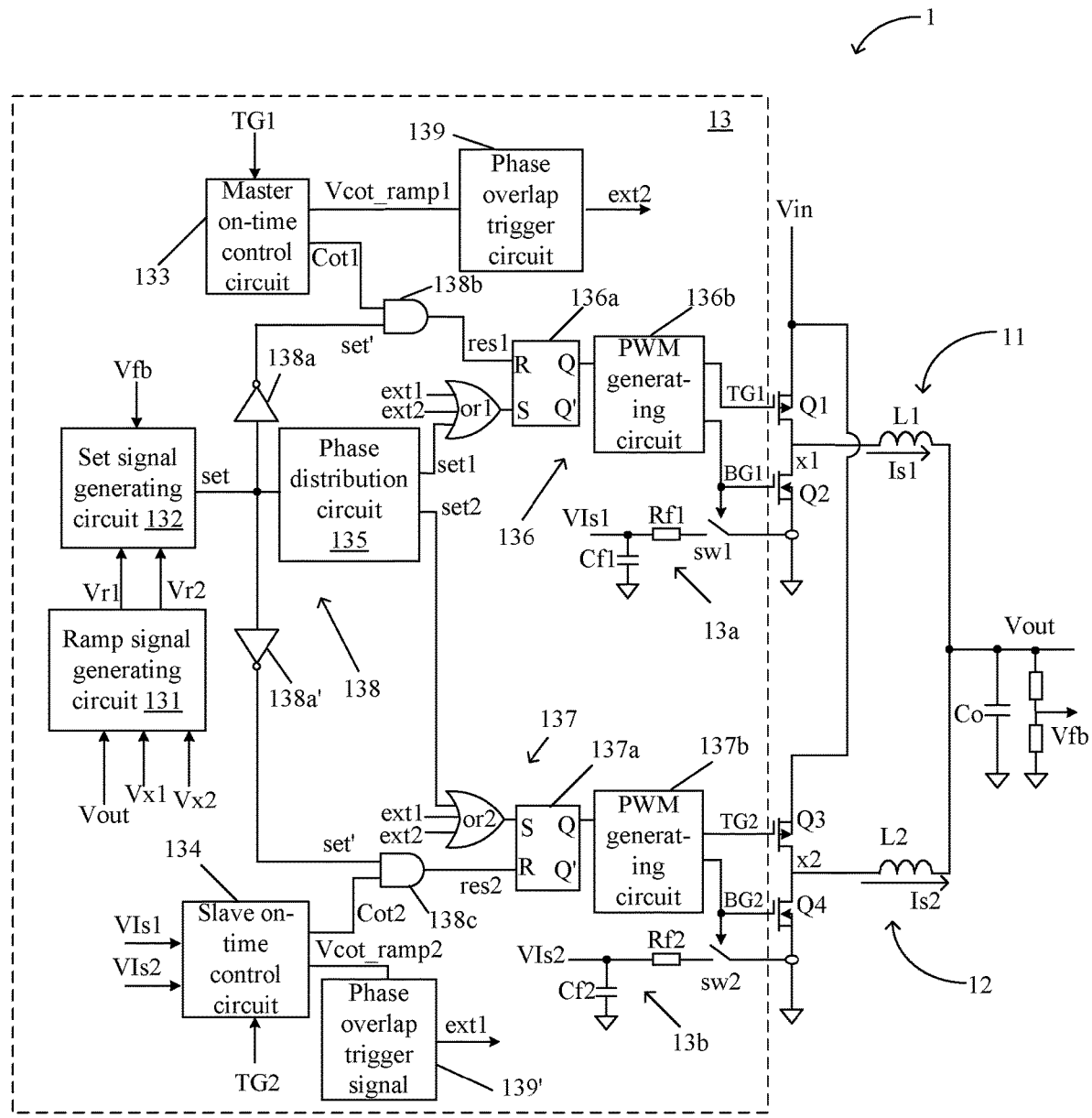
FIG. 2 is a schematic circuit diagram of an example control circuit, in accordance with embodiments of the present invention.

Referring now to FIG. 2, shown is a schematic circuit diagram of an example control circuit, in accordance with embodiments of the present invention. In this example, control circuit 13 can include ramp signal generating circuit 131, set signal generating circuit 132, master on-time control circuit 133, slave on-time control circuit 134, phase distribution circuit 135, logic circuit 136, logic circuit 137, shield circuit 138, phase overlap trigger circuit 139, and phase overlap trigger circuit 139'. Here, logic circuit 136 may correspond to master interleaved parallel branch 11, and can generate switching control signals TG1 and BG1 for power switch Q1 and rectifier switch Q2, respectively. Logic circuit 137 may correspond to slave interleaved parallel branch 12, and can generate switching control signals TG2 and BG2 for power switch Q3 and rectifier switch Q4, respectively. Phase overlap trigger circuit 139 and phase overlap trigger circuit 139' can correspond to master interleaved parallel branch 11 and slave interleaved parallel branch 12, respectively.

Also, set signal generating circuit 132 can generate set signal set based on a compensation signal and a ripple signal. The compensation signal can characterize a difference between output voltage Vout of switching converter 1 and an expected value of the output voltage. The ripple signal may be obtained from the output voltage of switching converter 1 and the voltages at intermediate nodes of each interleaved parallel branch (e.g., the voltages at intermediate node x1 and intermediate node x2). Set signal set can control when the power switches of each interleaved parallel branch (e.g., including the master interleaved parallel branch and the slave interleaved parallel branch) are turned on.

Figure 3:
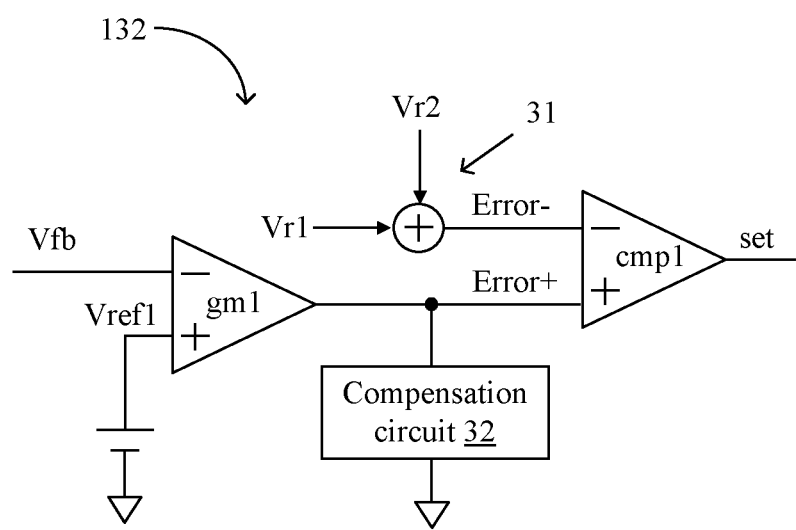
FIG. 3 is a schematic circuit diagram of an example set signal generating circuit, in accordance with embodiments of the present invention.

Referring now to FIG. 3, shown is a schematic circuit diagram of an example set signal generating circuit, in accordance with embodiments of the present invention. In this example, set signal generating circuit 132 can include error amplifier gm1, adder 31, and comparator cmp1. Here, one input terminal of error amplifier gm1 can receive feedback signal Vfb for characterizing the output voltage, the other input terminal of error amplifier gm1 can receive reference signal Vref1 for characterizing the expected value of the output voltage, and an output terminal of error amplifier gm1 may generate compensation signal Error+. Moreover, set signal generating circuit 132 can also include compensation circuit 32 to compensate the output of error amplifier gm1 before generating compensation signal Error+.

Alternatively, compensation circuit 32 can be a capacitor. Adder 31 can superimpose ramp signal Vr1 corresponding to master interleaved parallel branch 11 and ramp signal Vr2 corresponding to slave interleaved parallel branch 12 to generate a ripple signal (e.g., Error−). Comparator cmp1 can compare ripple signal Error− and compensation signal Error+ to generate set signal set. In this example, ramp signal Vr1 is a signal obtained based on the output voltage of the switching converter and voltage Vx1 at intermediate node x1 of master interleaved parallel branch 11. Ramp signal Vr2 can be a signal obtained based on the output voltage of the switching converter and voltage Vx2 at intermediate node x2 of slave interleaved parallel branch 12.

In this particular example, a non-inverting input terminal of error amplifier gm1 can receive reference signal Vref1, and an inverting input terminal of error amplifier gm1 may receive feedback signal Vfb. In other examples, the inverting input terminal of error amplifier gm1 can receive reference signal Vref1, and the non-inverting input terminal can receive feedback signal Vfb, which can also achieve substantially the same effect. Ramp signal generating circuit 131 can generate a corresponding ramp signal based on the output voltage of switching converter 1 and the voltage at the intermediate node of the corresponding interleaved parallel branch.

Figure 4:
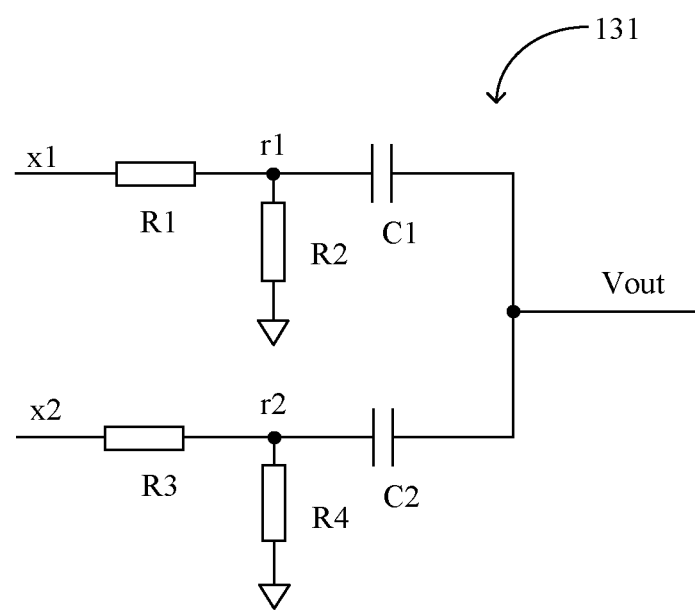
FIG. 4 is a schematic circuit diagram of an example ramp signal generating circuit, in accordance with embodiments of the present invention.

Referring now to FIG. 4, shown is a schematic circuit diagram of an example ramp signal generating circuit, in accordance with embodiments of the present invention. In this particular example, ramp signal generating circuit 131 can include resistors R1-R4, and capacitors C1 and C2. For example, one terminal of resistor R1 can connect to intermediate node x1 of master interleaved parallel branch 11, and the other terminal of resistor R1 can connect to intermediate node r1 of resistors R1 and R2. Resistor R2 can connect between intermediate node r1 and ground. Capacitor C1 can connect between intermediate node r1 and the output terminal of switching converter 1.

Thus, ramp signal Vr1 corresponding to master interleaved parallel branch 11 can be generated at intermediate node r1 according to voltage Vx1 at intermediate node x1 and output voltage Vout via resistors R1 and R2 and capacitor C1. One terminal of resistor R3 can connect to intermediate node x2 of salve interleaved parallel branch 12, and the other terminal of resistor R3 can connect to intermediate node r2 of resistors R3 and R4. Resistor R4 can connect between intermediate node r2 and ground. Capacitor C2 can connect between intermediate node r2 and the output terminal of switching converter 1. Also, ramp signal Vr2 corresponding to slave interleaved parallel branch 12 can be generated at intermediate node r2 according to voltage Vx2 of intermediate node x2 and output voltage Vout via resistors R3 and R4 and capacitor C2.

Figure 5:
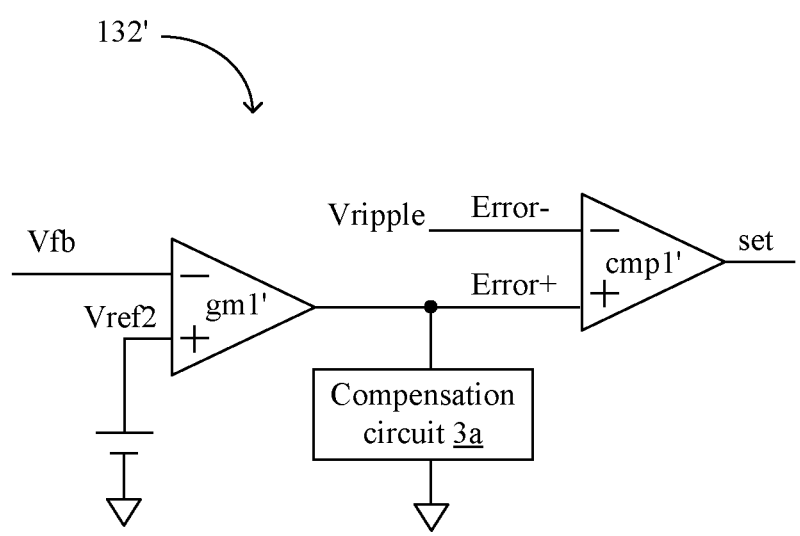
FIG. 5 is a schematic circuit diagram of another example set signal generating circuit, in accordance with embodiments of the present invention.

Referring now to FIG. 5, shown is a schematic circuit diagram of another example set signal generating circuit, in accordance with embodiments of the present invention. In this particular example, set signal generating circuit 132' can include error amplifier gm1', compensation circuit 3a, and comparator cmp1'. For example, the non-inverting input terminal of comparator cmp1' can receive ramp signal Vripple generated by ramp signal generating circuit 131' (see, e.g., FIG. 6).

Figure 6:
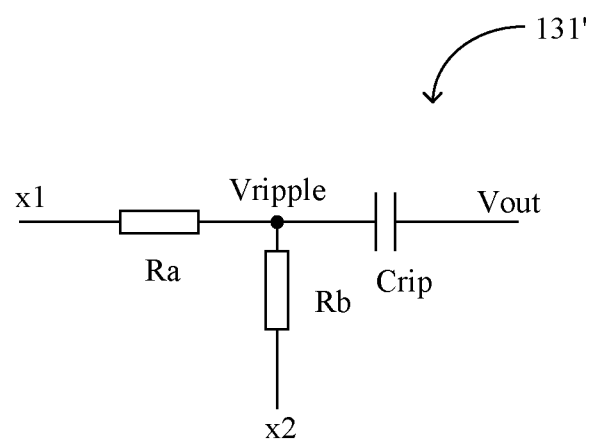
FIG. 6 is a schematic circuit diagram of another example ramp signal generating circuit, in accordance with embodiments of the present invention.

Referring now to FIG. 6, shown is a schematic circuit diagram of another example ramp signal generating circuit, in accordance with embodiments of the present invention. In this particular example, ramp signal generating circuit 131' can include resistors Ra and Rb, and capacitor Crip. Here, resistors Ra and Rb can connect in series between intermediate node x1 of master interleaved parallel branch 11 and intermediate node x2 of slave interleaved parallel branch 12. Capacitor Crip can connect between the common node of resistors Ra and Rb and the output terminal of switching converter 1. Ramp signal Vripple may be generated at the common node of resistors Ra and Rb and capacitor Crip.

Figure 7:
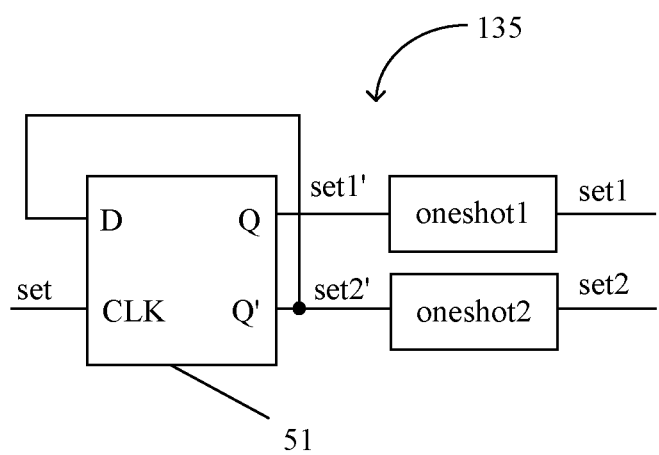
FIG. 7 is a schematic circuit diagram of an example phase distribution circuit, in accordance with embodiments of the present invention.

Referring now to FIG. 7, shown is a schematic circuit diagram of an example phase distribution circuit, in accordance with embodiments of the present invention. Phase distribution circuit 135 can generate an active turn-on trigger signal to selectively turn on the power switch in one of the interleaved parallel branches in a predetermined order according to set signal set. In this particular example, phase distribution circuit 135 can include D flip-flop 51, one-shot circuit oneshot1, and one-shot circuit oneshot2. For example, D flip-flop 51 may operate in response to the rising edge of set signal set. That is, when the rising edge of set signal set arrives, terminal CLK of D flip-flop 51 can be set to 1. If signal set2' generated by output terminal Q' of D flip-flop 51 in the last period is high (that is, terminal D of D flip-flop 51 is set to 1), and when terminal CLK of D flip-flop 51 is set to 1 again, signal set1' generated by output terminal Q of D flip-flop 51 can be high, and signal set2' generated by output terminal Q' may be low. When signal set1' is high, one-shot circuit oneshot1 can be controlled to generate turn-on trigger signal set1 for master interleaved parallel branch 11. When signal set2' is high, one-shot circuit oneshot2 can be controlled to generate turn-on trigger signal set2 for slave interleaved parallel branch 12.

In other words, phase distribution circuit 135 can alternately generate turn-on trigger signal set1 and set 2 according to the rising edge of set signal set (or alternatively can also be set according to the falling edge of set signal set), such that power switch Q1 of master interleaved parallel branch 11 and power switch Q3 of slave interleaved parallel branch 12 are alternately turned on. In this particular example, turn-on trigger signals set1 and set2 generated by phase distribution circuit 135 may have a phase difference of 180°, such that when switching converter 1 operates in the steady state, power switch Q1 and power switch Q3 are turned on with a phase shift of 180°. Thus, the ripple of the current flowing through inductors L1 and L2 can cancel each other out, such that the current ripple of the output current and the voltage ripple of the output voltage can be greatly reduced.

Figure 8:
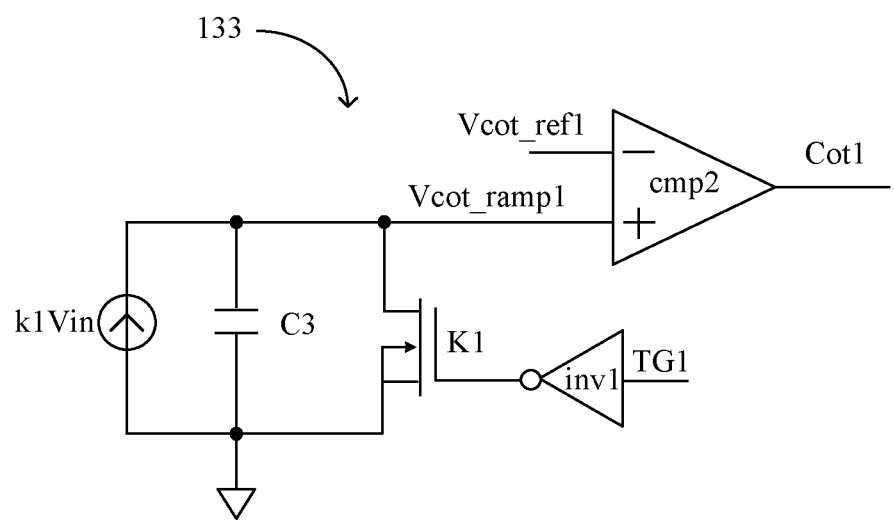
FIG. 8 is a schematic circuit diagram of an example main on-time control circuit, in accordance with embodiments of the present invention.

Referring now to FIG. 8, shown is a schematic circuit diagram of an example master on-time control circuit, in accordance with embodiments of the present invention. In this example, master on-time control circuit 133 can control the conduction time of power switch Q1 of master interleaved parallel branch 11 to be a constant time in the steady state. In this particular example, master on-time control circuit 133 can include inverter inv1, switch K1, capacitor C3, current source k1Vin, and comparator cmp2. Here, switch K1, capacitor C3 and current source k1Vin can connect in parallel between one input terminal (e.g., a non-inverting input terminal) of comparator cmp2 and ground. When switching control signal TG1 (e.g., power switch Q1 is turned on) is active, switch K1 can be controlled to be turned off, and then current source k1Vin can charge capacitor C3, such that voltage Vcot_ramp1 on capacitor C3 gradually rises. When voltage Vcot_ramp1 on capacitor C3 gradually rises to be greater than master on-time reference signal Vcot_ref1, master on-time control signal Cot1 generated by comparator cmp2 may be active. Therefore, switching control signal BG1 generated by logic circuit 136 can be active and switching control signal TG1 generated by logic circuit 136 can be inactive, thereby controlling rectifier switch Q2 to be turned on, and controlling power switch Q1 to be turned off. In this example, master on-time reference signal Vcot_ref1 can characterize the constant on-time of power switch Q1 of master interleaved parallel branch 11. In other examples, master on-time reference signal Vcot_ref1 may be a value proportional to the expected output voltage of the switching converter.

Referring also back to FIG. 2, logic circuit 136 can include OR-gate circuit or1, RS flip-flop 136a, and pulse-width modulation (PWM) generation circuit 136b. An input terminal of OR-gate circuit or1 can receive turn-on trigger signal set1 and phase overlap trigger signal ext1 generated by phase overlap trigger circuit 139', and thus RS flip-flop 136a can be set when turn-on trigger signal set1 and/or phase overlap trigger signal ext1 is active, thereby controlling PWM generation circuit 136b to generate active switching control signal TG1 and inactive switching control signal BG1 to control power switch Q1 to be turned on, and to control rectifier switch Q2 to be turned off. Similarly, logic circuit 137 can generate active switching control signal TG2 and inactive switching control signal BG2 when turn-on trigger signal set2 and/or phase overlap trigger signal ext2 generated by phase overlap trigger circuit 139 is active, thereby controlling power switch Q3 to be turned on, and controlling rectifier switch Q4 to be turned off. Logic circuit 137 can include OR circuit or2, RS flip-flop 137a, and PWM generation circuit 137b. Also, logic circuit 137 may have substantially the same circuit structure and operation as logic circuit 136.

When the load of switching converter 1 changes from the light load to the heavy load, compensation signal Error+ can increase as output voltage Vout decreases, which causes compensation signal Error+ to be greater than ripple signal Error– for a longer period of time, that is, set signal set is active for a long period of time. In order to make the switching converter enter the steady state under heavy load as soon as possible, master on-time control signal Cot1 generated by master on-time control circuit 133 and slave on-time control signal Cot2 generated by slave on-time control circuit 134 can be shielded when set signal set is active. That is, during the period when compensation signal Error+ is greater than ripple signal Error–, on-time control signals of the power switches of the interleaved parallel branches may be shielded, such that the power switches of the interleaved parallel branches that are in the on state remain to be on without being affected by the corresponding on-time control signal.

Shield circuit 138 can shield the output signals (e.g., master on-time control signal Cot1 and slave on-time control signal Cot2) generated by master on-time control circuit 133 and slave on-time control circuit 134 when the load changes from the light load to the heavy load and set signal set is active, such that the power switches of the interleaved parallel branches that are in the on state can remain to be on, thereby improving the dynamic response performance of the system. Shield circuit 138 may not shield the on-time control signals when set signal set is inactive. As shown in FIG. 2, shield circuit 138 can include inverters 138a and 138a', and AND-gate circuits 138b and 138c. Here, inverter 138a can invert set signal set and then transfer the inverted version of set signal set to AND-gate circuit 138b, and inverter 138a' is can invert set signal set and then transfer the inverted version of set signal set to AND-gate circuit 138c. If switching converter 1 switches from the light load mode to the heavy load mode during the conduction of power switch Q1, set signal set can be continuously active, and thus even if master on-time control signal Cot1 generated by master on-time control circuit 133 is active, reset signal res1 generated by AND-gate circuit 138b can also be inactive, such that switching control signal TG1 generated by logic circuit 136 continues to be active, and power switch Q1 remains to be on.

When the on time of power switch Q1 of master interleaved parallel branch 11 is greater than a predetermined first time threshold, phase overlap trigger signal ext2 generated by phase overlap trigger circuit 139 can be active, such that logic circuit 137 can control power switch Q3 of slave interleaved parallel branch 12 to be turned on, thereby controlling the conduction phases of power switches Q1 and Q3 to be overlapped to improve the dynamic response performance of the system. Similarly, when the on time of power switch Q3 of slave interleaved parallel branch 12 is greater than a predetermined second time threshold, phase overlap trigger signal ext1 generated by phase overlap trigger circuit 139' can be active, such that logic circuit 136 controls power switch Q1 of master interleaved parallel branch 11 to be turned on, thereby controlling the conduction phases of power switches Q1 and Q3 to be overlapped to improve the dynamic response performance of the system. It should be understood that when the switching converter includes a plurality of interleaved parallel branches, phase overlap trigger signal ext2 generated by phase overlap trigger circuit 139 may control some or all of the logic circuits corresponding to the slave interleaved parallel branches to control the corresponding power switches to be turned on.

Similarly, when the on time of the corresponding power switch in one of the slave interleaved parallel branches is greater than a predetermined time threshold, the phase overlap trigger signal generated by the corresponding phase overlap trigger circuit can control the power switches corresponding to some or all of the other interleaved parallel branches (including other slave interleaved parallel branches and master interleaved parallel branch) to be turned on. It should be understood that the predetermined time thresholds corresponding to the power switches of each of the interleaved parallel branches are not completely the same, and may be separately set according to the performance standards of the switching converter in practical applications.

Figure 9:
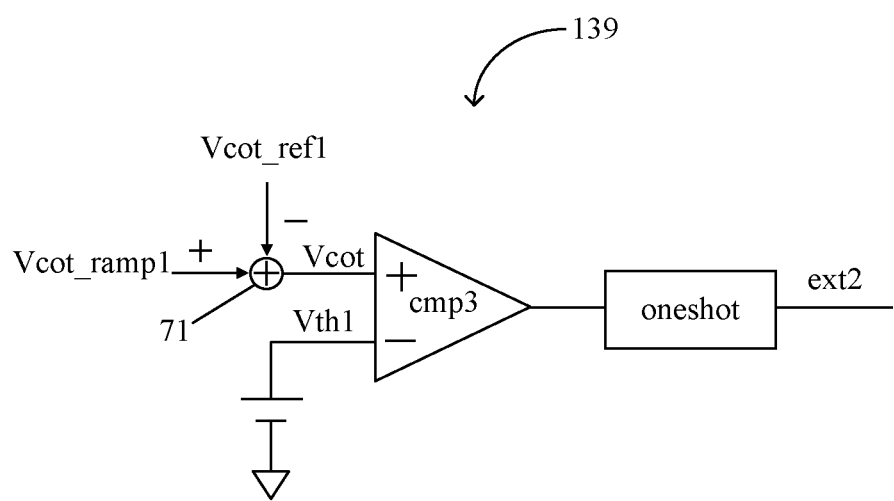
FIG. 9 is a schematic circuit diagram of an example phase overlap trigger circuit, in accordance with embodiments of the present invention.

Referring now to FIG. 9, shown is a schematic circuit diagram of an example phase overlap trigger circuit, in accordance with embodiments of the present invention. In this example, phase overlap trigger circuit 139 corresponds to master interleaved parallel branch 11. In this particular example, phase overlap trigger circuit 139 can include adder 71, comparator cmp3, and one-shot circuit oneshot. For example, adder 71 may generate time error signal Vcot based on the difference between master on-time reference signal Vcot_ref1 and voltage Vcot_ramp1 on capacitor C3. Time error signal Vcot can characterize the difference between the on time of power switch Q1 at present and the on time of power switch Q1 in the steady state. Input terminals of comparator cmp3 can receive time error signal Vcot and time reference signal Vth1, respectively. Here, time reference signal Vth1 may represent the difference between the time threshold of the predetermined on-time of power switch Q1 and the constant on time. Thus, when time error signal Vcot is greater than time reference signal Vth1, comparator cmp3 can generate an active signal, such that one-shot circuit oneshot can generate active phase overlap trigger signal ext2.

Referring also back to FIG. 2, when phase overlap trigger signal ext2 is active, OR-gate circuit or2 in logic circuit 137 can generate an active signal to set RS flip-flop 137a, such that switching control signal TG2 generated by PWM generation circuit 137b can be active, thereby controlling power switch Q3 to be turned on. Therefore, the conduction phases of power switches Q1 and Q3 can be overlapped by phase overlap trigger circuit 139, thereby improving the dynamic response performance of the system. It should be understood that the above description is exemplified under the condition that the switching converter switches from the light load mode to the heavy load mode during the turn-on period of power switch Q1 of master interleaved parallel branch 11, and the above control method can also be applied when the switching converter switches from the light load mode to the heavy load mode during the turn-on period of power switches of other slave interleaved parallel branches. Moreover, slave on-time control circuit 134 can control the on-time of power switch Q3 based on the difference between inductor current Is2 of slave interleaved parallel branch 12 and inductor current Is1 of master interleaved parallel branch 11. For example, inductor current Is1 and inductor current Is2 are the average values of the inductor current in one switching cycle.

Figure 10:
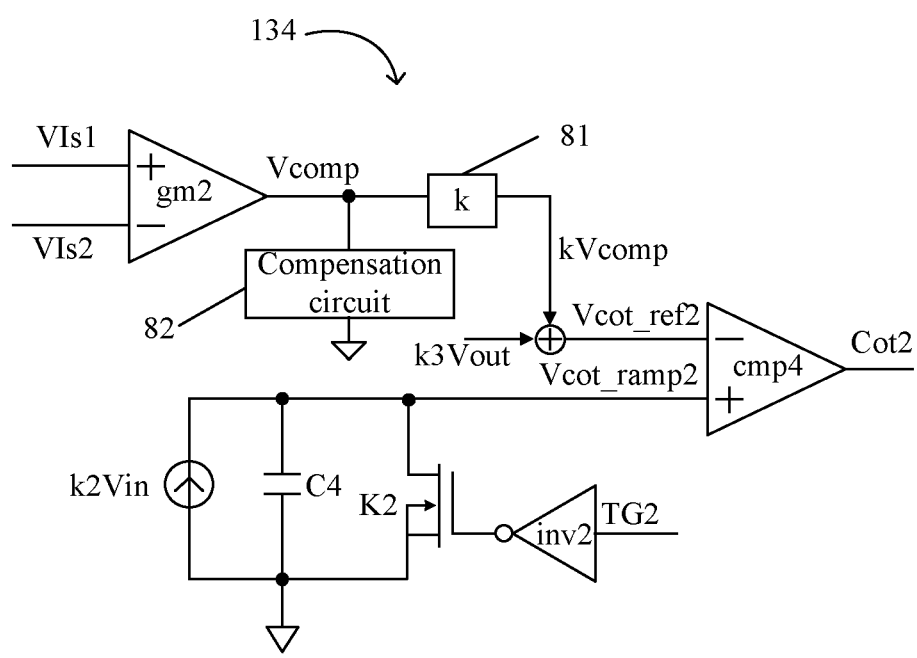
FIG. 10 is a schematic circuit diagram of an example slave on-time control circuit, in accordance with embodiments of the present invention.

Referring now to FIG. 10, shown is a schematic circuit diagram of an example slave on-time control circuit, in accordance with embodiments of the present invention. In this example, slave on-time control circuit 134 can include error amplifier gm2, multiplier 81, compensation circuit 82, inverter inv2, switch K2, capacitor C4, current source k2Vin, and comparator cmp4. For example, switch K2, capacitor C4 and current source k2Vin can connect in parallel between one input terminal (e.g., a non-inverting input terminal) of comparator cmp4 and the ground. Switch K2 can be controlled to be turned on or off according to switching control signal TG2. When switching control signal TG2 is active, switch K2 can be controlled to be turned off, and then current source k2Vin can charge capacitor C4. When voltage Vcot_ramp2 on capacitor C4 rises to be greater than slave on-time reference signal Vcot_ref2, slave on-time control signal Cot2 generated by comparator cmp4 can be active, such that switching control signal BG2 generated by logic circuit 137 is active and switching control signal TG2 generated by logic circuit 137 is inactive, thereby controlling power switch Q3 to be turned off, and controlling rectifier switch Q4 to be turned on.

A non-inverting input terminal and an inverting input terminal of error amplifier gm2 may receive current sampling signal VIs1 for characterizing the inductor current of master interleaved parallel branch 11 and current sampling signal VIs2 for characterizing the inductor current of slave interleaved parallel branch 12, respectively. Compensation circuit 82 can connect between an output terminal of error amplifier gm2 and the ground. In an alternative example, compensation circuit 82 can be a capacitor. An output signal of error amplifier gm2 can be compensated by compensation circuit 82 to generate on-time compensation signal Vcomp. Also, multiplier 81 receives on-time compensation signal Vcomp to generate signal kVcomp which is superimposed with signal k3Vout proportional to output voltage Vout to generate slave on-time reference signal Vcot_ref2. Therefore, when inductor current Is2 of slave interleaved parallel branch 12 is less than inductor current Is1 of master interleaved parallel branch 11, on-time compensation signal Vcomp may increase.

Then, slave on-time reference signal Vcot_ref2 increases as on-time compensation signal Vcomp increases, such that the duration that voltage Vcot_ramp2 on capacitor C4 rises to be greater than slave on-time reference signal Vcot_ref2 increases. That is, the on-time of power switch Q3 is extended, and thus inductor current Is2 of salve interleaved parallel branch 12 increases accordingly. Similarly, when inductor current Is2 of slave interleaved parallel branch 12 is greater than inductor current Is1 of master interleaved parallel branch 11, on-time compensation signal Vcomp may be reduced to shorten the on-time of power switch Q3, such that inductor current Is2 of slave interleaved parallel branch 12 is correspondingly reduced. Thus, slave on-time control circuit 134 can control the on-time of power switch Q3 based on the difference between inductor current Is2 of slave interleaved parallel branch 12 and inductor current Is1 of master interleaved parallel branch 11, and the average value of the inductor current in each interleaved parallel branch is kept substantially equal, thereby reducing the ripple of the output current of the switching converter.

Alternatively, as shown in FIG. 2, control circuit 13 can also include current sampling circuit 13a and current sampling circuit 13b, which can respectively acquire current sampling signals VIs1 and VIs2 for characterizing inductor currents Is1 and Is2. In this example, current sampling circuit 13a can connect between rectifier switch Q2 and ground, and may include switch sw1, resistor Rf1, and capacitor Cf1. Here, switch sw1 can be controlled to be turned on when switching control signal BG1 is active. After switch sw1 is turned on, capacitor Cf1 can be charged, and the voltage on capacitor Cf1 (e.g., current sampling signal VIs1) gradually rises until switch sw1 is controlled to be turned off, such that current sampling signal VIs1 held on capacitor Cf1 may be obtained. For example, current sampling signal VIs1 can be sampled at sampling points between rectifier switch Q2 and ground, and other sampling points capable of obtaining the average value of the inductor current of master interleaved parallel branch 11 (e.g., directly sampling on inductor L1) can also be applied in certain embodiments. Similarly, current sampling circuit 13b can connect between rectifier switch Q4 and ground, and can include switch sw2, resistor Rf2 and capacitor Cf2.

It should be understood that the switching converter may include a plurality of slave interleaved parallel branches, and the control method is similar to that of the slave interleaved parallel branch in switching converter 1. The ripple of the output current and the output voltage when the switching converter operates in the steady state can be reduced with the increase of the amount of the interleaved parallel branches included in the switching converter, thereby achieving better dynamic response performance during the switching of the operating mode.

Figure 11:
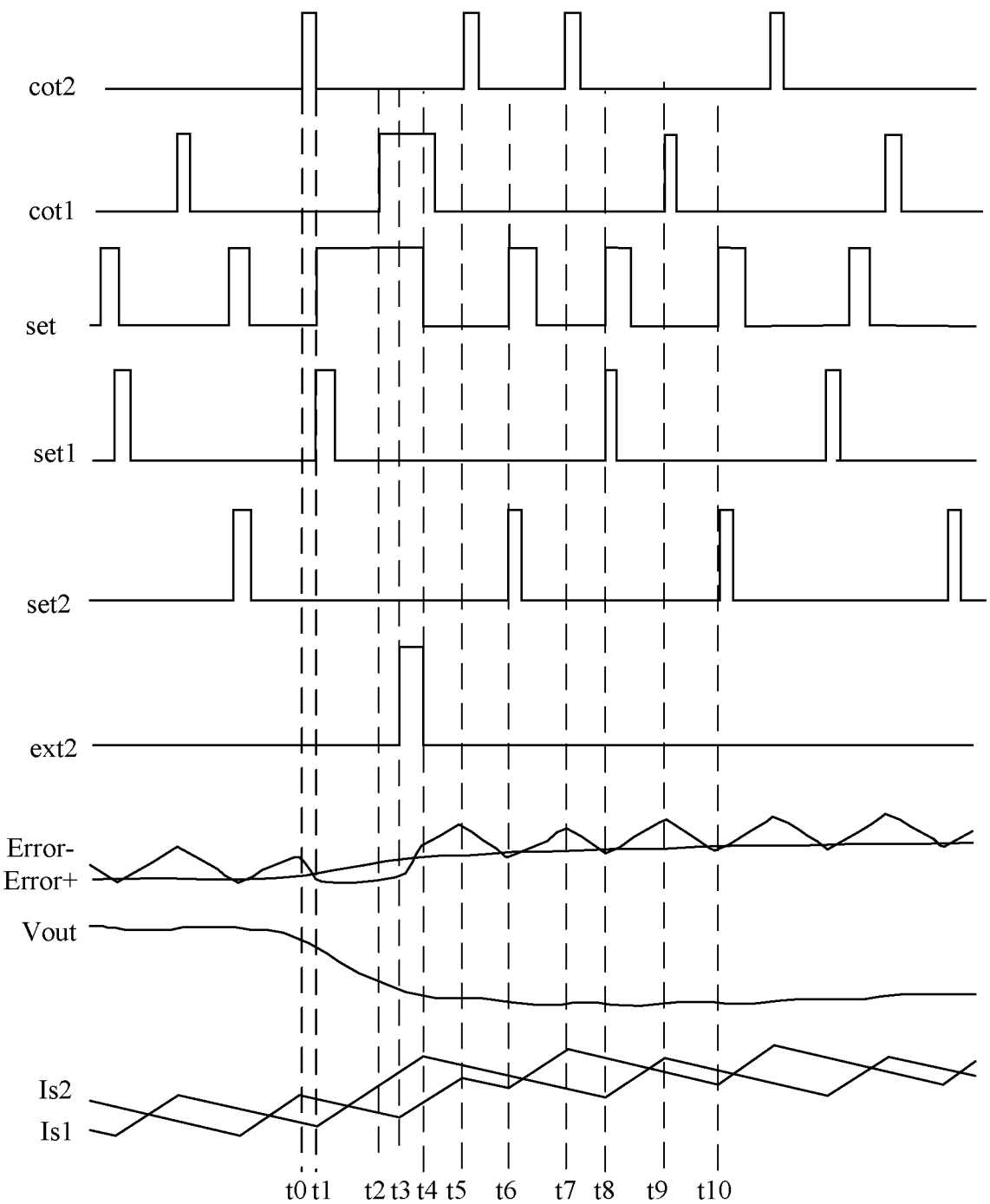
FIG. 11 is a waveform diagram of first example operation of the switching converter, in accordance with embodiments of the present invention.

Referring now to FIG. 11, shown is a waveform diagram of first example operation of the switching converter, in accordance with embodiments of the present invention. In this example, at time t0, the load changes from the light load to the heavy load, output voltage Vout starts to decrease, and feedback signal Vfb of the output voltage decreases. Referring also back to FIG. 3, since feedback signal Vfb decreases, compensation signal Error+ can increase after being amplified and compensated. At time t1, compensation signal Error+ can increase to be greater than ripple signal Error−, and then set signal set generated by comparator cmp1 can be at a high level. At the rising edge of set signal set (e.g., at time t1), phase distribution circuit 135 may be controlled by set signal set to generate the active turn-on trigger signal set1 to set RS flip-flop 136a, such that switching control signal TG1 generated by PWM generation circuit 136b is active and switching control signal BG1 generated by PWM generation circuit 136b is inactive, thereby controlling the power switch Q1 to be turned on, and controlling rectifier switch Q2 to be turned off. At this time, inductor current Is1 of master interleaved parallel branch 11 may begin to rise.

Since switching control signal TG1 can be active (see, e.g., FIG. 8), switch K1 can be controlled by switching control signal TG1 to be turned off, and current source k1Vin may begin to charge capacitor C3. At time t2, voltage Vcot_ramp1 on capacitor C3 can rise to be greater than master on-time reference signal Vcot_ref1, and thus master on-time control signal Cot1 generated by comparator cmp2 may be active. However, since compensation signal Error+ is still greater than ripple signal Error− at this time (e.g., set signal set is still active), shield circuit 138 can shield the effective master on-time control signal Cot1. Therefore, reset signal res1 may still controlled to be inactive even if the on-time of power switch Q1 has reached the constant on time, such that power switch Q1 continues to be turned on, and rectifier switch Q2 continues to be turned off. At this time, inductor current Is1 of master interleaved parallel branch 11 can continue rising.

At time t3 (see, e.g., FIG. 9), time error signal Vcot may be greater than time reference signal Vth1 (e.g., the on time of power switch Q1 of master interleaved parallel branch 11 is greater than the threshold time), and then comparator cmp3 can generate an active signal, such that phase overlap trigger signal ext2 generated by one-shot circuit oneshot is active. Thus, switching control signal TG2 generated by logic circuit 137 can be active and switching control signal BG2 generated by logic circuit 137 can be inactive, thereby controlling power switch Q3 to be turned on and controlling rectifier switch Q4 to be turned off. At this time, inductor current Is2 of slave interleaved parallel branch 12 can begin to increase, and inductor current Is1 of master interleaved parallel branch 11 may continue rising.

At time t4, compensation signal Error+ can be less than ripple signal Error−, such that set signal set is inactive, and thus shield circuit 138 may not shield. Reset signal res1 generated by AND circuit 138b may be active to reset RS flip-flop 136a, such that power switch Q1 is controlled to be turned off, and rectifier switch Q2 can be controlled to be turned on. At this time, inductor current Is1 of master interleaved parallel branch 11 can begin to decrease, and inductor current Is2 of slave interleaved parallel branch 12 may continue rising. Therefore, the conduction phases of power switch Q1 of master interleaved parallel branch 11 and power switch Q3 of slave interleaved parallel branch 12 are overlapped, such that the output current of the switching converter can be further increased, thereby causing switching converter 1 to enter the steady state under the heavy load mode as soon as possible, which improves the dynamic response performance of the system.

At time t3 (see, e.g., FIG. 10), switching control signal TG2 can be active, such that switch K2 of slave on-time control circuit 134 is controlled to turn off, and current source k2Vin begins to charge capacitor C4. At time t5, voltage Vcot_ramp2 on capacitor C4 can rise to be greater than slave on-time reference signal Vcot_ref2, and then slave on-time control signal Cot2 generated by comparator cmp4 may be active. Further, at this time, compensation signal Error+ can be less than ripple signal Error−, and set signal set may be inactive. Therefore, slave on-time control signal Cot2 may not be shielded by shield circuit 138. Thus, at time t5, switching control signal TG2 generated by logic circuit 137 may be inactive and switching control signal BG2 generated by logic circuit 137 can be active based on slave on-time control signal Cot2, thereby controlling power switch Q3 to be turned off, and controlling rectifier switch Q4 to be turned on. At this time, inductor current Is2 of slave interleaved parallel branch 12 may begin to decrease, and inductor current Is1 of master interleaved parallel branch 11 can continue decreasing.

At time t6, compensation signal Error+ may be greater than ripple signal Error−, and set signal set may be active. Thus, turn-on trigger signal set2 generated by phase distribution circuit 135 may be active. For example, phase distribution circuit 135 can alternately generate turn-on trigger signals set1 and set2. Therefore, switching control signal TG2 generated by logic circuit 137 is active and switching control signal BG2 generated by logic circuit 137 may be inactive, thereby controlling power switch Q3 to be turned on, and controlling rectifier switch Q4 to be turned off. At this time, inductor current Is2 of slave interleaved parallel branch 12 may begin to increase, and inductor current Is1 of master interleaved parallel branch 11 can continue decreasing.

At time t6, switching control signal TG2 may be active, such that switch K2 in slave on-time control circuit 134 is controlled to be turned off, and current source k2Vin begins to charge capacitor C4. At time t7, voltage Vcot_ramp2 on capacitor C4 can rise to be greater than slave on-time reference signal Vcot_ref2, and then slave on-time control signal Cot2 generated by comparator cmp4 may be active. Thus, switching control signal TG2 generated by logic circuit 137 can be inactive and switching control signal BG2 generated by logic circuit 137 may be active, thereby controlling power switch Q3 to be turned off and controlling rectifier switch Q4 to be turned on. At this time, inductor current Is2 of slave interleaved parallel branch 12 may begin to decrease, and inductor current Is1 of master interleaved parallel branch 11 can continue decreasing.

At time t8, compensation signal Error+ may be greater than ripple signal Error−, and set signal set can be active. Thus, turn-on trigger signal set1 generated by phase distribution circuit 135 may be active. Therefore, switching control signal TG1 generated by logic circuit 136 may be active and switching control signal BG1 generated by logic circuit 136 can be inactive based on turn-on trigger signal set1, thereby controlling power switch Q1 to be turned on, and controlling rectifier switch Q2 to be turned off. At this time, inductor current Is1 of master interleaved parallel branch 11 can begin to increase, and inductor current Is2 of slave interleaved parallel branch 12 may continue decreasing.

At time t8, switching control signal TG1 is active, such that switch K1 in master on-time control circuit 133 can be controlled to be turned off, and current source k1Vin may begin to charge capacitor C3. At time t9, voltage Vcot_ramp1 on capacitor C3 can rise to be greater than master on-time reference signal Vcot_ref1, and then master on-time control signal Cot1 generated by comparator cmp2 may be active. Thus, switching control signal TG1 generated by logic circuit 136 may be inactive and switching control signal BG1 generated by logic circuit 136 can be active, thereby controlling power switch Q1 to be turned off and controlling rectifier switch Q2 to be turned on. At this time, inductor current Is1 of master interleaved parallel branch 11 may begin to decrease, and inductor current Is2 of slave interleaved parallel branch 12 can continue decreasing.

This example operating process during time t6-t9 is a steady-state working process of the switching converter under heavy load. From time t10, the operating process during time t6-t9 can be repeated; that is, the switching converter starts to work stably in the heavy load mode. In particular embodiments, the switching converter can include a plurality of interleaved parallel branches. In addition, the conduction phases of the power switches in each interleaved parallel branch can be overlapped during the process when the load changes from the light load to the heavy load, in order to improve the dynamic response performance of the system.

Figure 12:
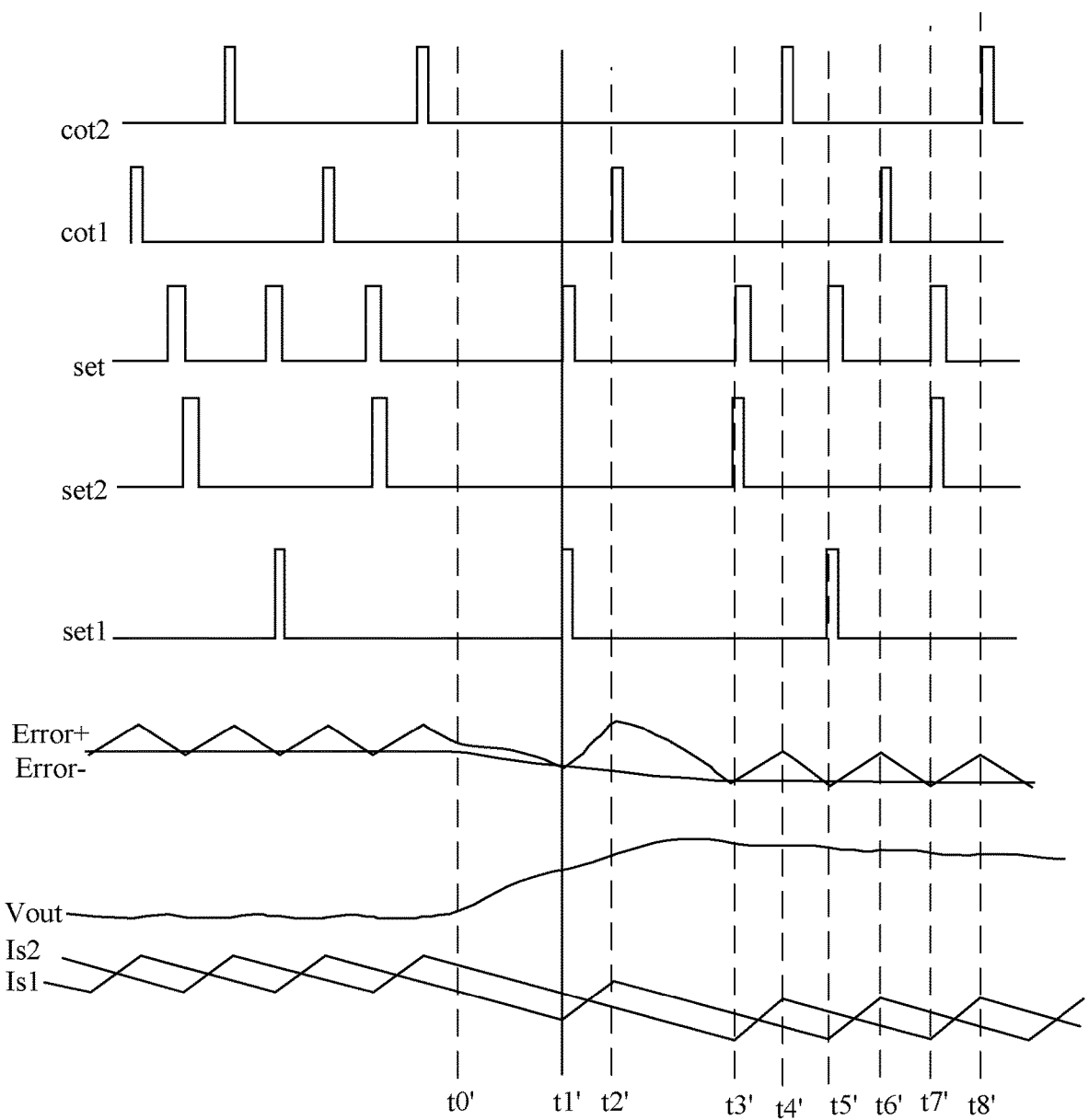
FIG. 12 is a waveform diagram of second example operation of the switching converter, in accordance with embodiments of the present invention.

Referring now to FIG. 12, shown is a waveform diagram of second example operation of the switching converter, in accordance with embodiments of the present invention. In this example, the switching converter can switch from a heavy load mode to a light load mode. At time t0', the load changes from the heavy load to the light load, such that output voltage Vout begins to increase, and feedback signal Vfb of the output voltage increases. Referring also back to FIG. 3, since feedback signal Vfb increases, compensation signal Error+ can decrease after being amplified and compensated. At time t1', compensation signal Error+ can decrease to be greater than ripple signal Error−, and then set signal set generated by comparator cmp1 can be high. Also, phase distribution circuit 135 may be controlled by set signal set to generate the active turn-on trigger signal set1, such that switching control signal TG1 generated by logic circuit 136 is active and switching control signal BG1 generated by logic circuit 136 is inactive, thereby controlling power switch Q1 to be turned on, and controlling rectifier switch Q2 to be turned off. At this time, inductor current Is1 of master interleaved parallel branch 11 may begin to increase, and inductor current Is2 of slave interleaved parallel branch 12 can continue decreasing.

At time t2', master on-time control signal Cot1 generated by master on-time control circuit 133 can be active, such that switching control signal TG1 generated by logic circuit 136 is inactive and switching control signal BG1 generated by logic circuit 136 is active, thereby controlling power switch Q1 to be turned off, and controlling rectifier switch Q2 to be turned on. At this time, inductor current Is1 of master interleaved parallel branch 11 can begin to decrease, and inductor current Is2 of slave interleaved parallel branch 12 may continue decreasing.

At time t3', compensation signal Error+ may be greater than ripple signal Error−, and set signal set can be active. Phase distribution circuit 135 can be controlled to generated active turn-on trigger signal set2, such that switching control signal TG2 generated by logic circuit 137 is active and switching control signal BG2 generated by logic circuit 137 is inactive, thereby controlling power switch Q3 to be turned on, and controlling rectifier switch Q4 to be turned off. At this time, inductor current Is2 of slave interleaved parallel branch 12 may begin to increase, and inductor current Is1 of master interleaved parallel branch 11 can continue decreasing. At time t4', slave on-time control signal Cot2 generated by slave on-time control circuit 134 may be active, such that power switch Q3 is controlled to be turned off, and rectifier switch Q4 is controlled to be turned on. At this time, inductor current Is2 of slave interleaved parallel branch 12 may begin to decrease, and inductor current Is1 of master interleaved parallel branch 11 can continue decreasing.

At time t5', compensation signal Error+ may be greater than ripple signal Error−, and set signal set can be active. Phase distribution circuit 135 can be controlled to generated active turn-on trigger signal set1, such that power switch Q1 is controlled to be turned on, and rectifier switch Q2 is controlled to be turned off. At this time, inductor current Is1 of master interleaved parallel branch 11 may begin to increase, and inductor current Is2 of slave interleaved parallel branch 12 can continue decreasing. At time t6', master on-time control signal Cot1 generated by master on-time control circuit 133 may be active, such that power switch Q1 can be controlled to be turned off, and rectifier switch Q2 can be controlled to be turned on. At this time, inductor current Is1 of master interleaved parallel branch 11 may begin to decrease, and inductor current Is2 of slave interleaved parallel branch 12 can continue decreasing.

At time t7', compensation signal Error+ can be greater than ripple signal Error−, and set signal set may be active. Phase distribution circuit 135 can be controlled to generated active turn-on trigger signal set2, such that power switch Q3 is controlled to be turned on, and rectifier switch Q4 is controlled to be turned off. At this time, inductor current Is2 of slave interleaved parallel branch 12 may begin to increase, and inductor current Is1 of master interleaved parallel branch 11 can continue decreasing. For example, the operating process during time t3'-t7' is a steady-state working process of the switching converter under the light load. From time t8', the operating process during time t3'-t7' can be repeated; that is, the switching converter may begin to operate stably under the light load condition.

In particular embodiments, each of the ramp signals for generating ripple signal Error− can be generated by the voltage at the intermediate node of each of the interleaved parallel branches and the output voltage. Therefore, during the process in which the load of the switching converter changes from a heavy load to a light load, the time during which ripple signal Error− is larger than compensation signal Error+ increases, and thus the on-time of the rectifier switch corresponding to each of the interleaved parallel branches increases, such that the output current and output voltage of the switching converter enter the steady state more quickly, which can improve the dynamic response performance of the system.

Figure 13:
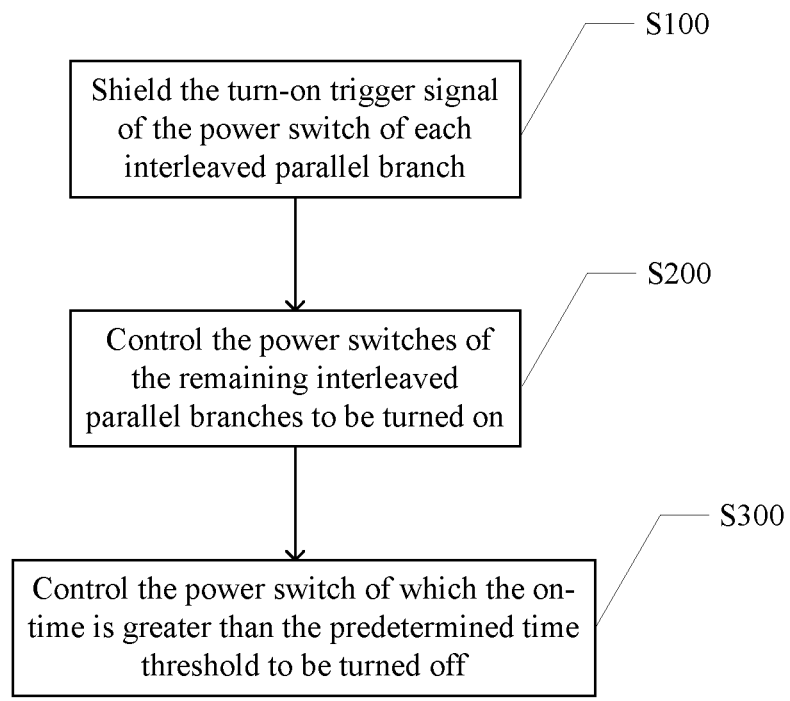
FIG. 13 is a flow chart of an example control method of the switching converter, in accordance with embodiments of the present invention.

Referring now to FIG. 13, shown is a flow diagram of an example control method of the switching converter, in accordance with embodiments of the present invention. During the process of switching the load of the switching converter from a light load to a heavy load, the output voltage can drop, causing compensation signal Error+ to increase. Therefore, compensation signal Error+ may continue to be greater than the ripple signal for a longer period of time after the load has changed from the light load to the heavy load. The compensation signal can characterize the difference between the output voltage of the switching converter and the expected value of the output voltage. The ripple signal may be obtained from the output voltage of the switching converter and the voltage at the intermediate node of each interleaved parallel branch. Alternatively, the ripple signal can be obtained by superimposing the ramp signals corresponding to interleaved parallel branches. For example, the ramp signal is a signal obtained based on the output voltage of the switching converter and the voltage at the intermediate node of the corresponding interleaved parallel branch. When the compensation signal is greater than the ripple signal, the set signal can be active, and the phase distribution circuit may generate the turn-on trigger signal in response to the rising or falling edge of the set signal to trigger the power switch of a corresponding one of the interleaved parallel branches.

For example, at S100, the turn-on trigger signal of the power switch of each interleaved parallel branch can be shielded. When the time during which compensation signal Error+ continues to be greater than ripple signal Error− (e.g., the time that set signal set is active) is greater than the on-time of the power switch in the steady state (e.g., set signal set is still active after the on-time of the power switch is reached the conduction time in the steady state), the on-time control signal of the power switch may be shielded such that the power switch continues to be turned on. For example, after the power switch of the master interleaved parallel branch is turned on for the constant time in the steady state, set signal set can remain active, and the master on-time control signal generated by the master on-time control circuit may be shielded, such that the corresponding power switch continues to be turned on.

At S200, the power switches of the remaining interleaved parallel branches can be controlled to be turned on. For example, after the time when compensation signal Error+ continues to be greater than ripple signal Error− is greater than a predetermined time threshold, the power switches of the remaining interleaved parallel branches can be controlled to be turned on. The predetermined time threshold may be greater than the on-time of the power switch at the steady state. That is to say, after the on-time of the power switch of a corresponding one of the interleaved parallel branches in the switching converter is greater than the predetermined time threshold, the power switches in the other interleaved parallel branches can be controlled to be turned on to realize the conduction phases of the power switch of each interleaved parallel branch to be overlapped, thereby improving the dynamic response of the load.

Further, the power switch of the master interleaved parallel branch in the remaining interleaved parallel branches can be controlled in a constant on-time mode. The power switches corresponding to the slave interleaved parallel branches in the remaining interleaved parallel branches may be controlled according to the difference between the corresponding inductor current and the inductor current of the master interleaved parallel branch.

At S300, the power switch of which the on-time is greater than the predetermined time threshold can be controlled to be turned off. For example, after compensation signal Error+ is less than ripple signal Error− (e.g., when set signal set is inactive), the on-time control signal may not be shielded, such that the power switch can be controlled to be turned off by the corresponding logic circuit according to the active on-time control signal. Thus, during the process of switching the load of the switching converter from a light load to a heavy load, the time during which the compensation signal continues to be greater than the ripple signal can be used to characterize the current on-time of the power switch that is selected to be turned on.

Further, the switching converter can control the conduction phases of the power switches of the interleaved parallel branches not to be overlapped when operating in the steady state, in order to reduce the ripple. The turn-on moment the power switches of each of the interleaved parallel branches may be controlled to be turned on is determined by comparing the compensation signal and the ripple signal. For example, when the comparison result satisfies the predetermined condition, one of the interleaved parallel branches can be selected in a predetermined order, and the power switch of the selected interleaved parallel branch may be triggered to be turned on. For example, the on-time of the power switch of the master interleaved parallel branch can be controlled in a constant on-time mode, and the on-time of the power switch of each slave interleaved parallel branch may be controlled according to the difference between the inductor current of corresponding slave interleaved parallel branch and the inductor current of the master interleaved parallel branch. In this way, the dynamic response performance of the system can be improved by controlling the conduction phases of the power switches of the interleaved parallel branches to be overlapped when the load changes from the light load to the heavy load.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling a switching converter having a plurality of interleaved parallel branches, the method comprising:
    a) controlling conduction phases of power switches of the plurality of interleaved parallel branches to be overlapped when a load changes from a light load to a heavy load, in order to improve dynamic response performance of the switching converter;
    b) determining a turn-on moment of the power switch of each interleaved parallel branch in accordance with a compensation signal and a ripple signal, wherein the compensation signal is configured to characterize a difference between an output voltage of the switching converter and an expected value of the output voltage, and the ripple signal is obtained in accordance with the output voltage and voltages at intermediate nodes of each of the interleaved parallel branches;
    c) shielding on-time control signals corresponding to each interleaved parallel branch when the compensation signal is continuously greater than the ripple signal; and
    d) controlling the power switches of remaining interleaved parallel branches to be turned on when a time that the compensation signal is continuously greater than the ripple signal is greater than a predetermined time threshold.

2. The method of claim 1, further comprising controlling the conduction phases of the power switches of the plurality of interleaved parallel branches not to be overlapped when the switching converter operates in a steady state to reduce ripple.

3. The method of claim 1, wherein when the load changes from the light load to the heavy load, at least one on-time control signal of corresponding branch is disabled to achieve simultaneous conduction control for at least two power switches.

4. The method of claim 1, further comprising controlling the power switches corresponding to the plurality of interleaved parallel branches to be turned on in a predetermined order, in accordance with a comparison result of the compensation signal and the ripple signal.

5. The method of claim 2, further comprising:
    a) controlling on-time of the power switch of a master interleaved parallel branch to be a constant time in the steady state; and
    b) controlling on-time of the power switches of each of slave interleaved parallel branches in accordance with difference between an inductor current of each slave interleaved parallel branch and an inductor current of the master interleaved parallel branch correspondingly.

6. The method of claim 1, further comprising:
    a) controlling the power switch of a master interleaved parallel branch in the remaining interleaved parallel branches to be turned on for a constant time; and
    b) controlling on-time of the power switches of each slave interleaved parallel branch in the remaining interleaved parallel branches in accordance with difference between an inductor current of each slave interleaved parallel branch and an inductor current of the master interleaved parallel branch correspondingly.

7. The method of claim 1, further comprising controlling the power switch of which the on-time is greater than the predetermined time threshold to be turned off when the compensation signal is not greater than the ripple signal.

8. A control circuit for a switching converter, wherein the switching converter comprises a plurality of interleaved parallel branches, wherein the control circuit is configured to control conduction phases of power switches of the interleaved parallel branches to be overlapped when a load changes from a light load to a heavy load, in order to improve dynamic response performance of the switching converter, wherein the control circuit comprises:
    a) a plurality of shield circuits configured to shield on-time control signals corresponding to the power switches of each interleaved parallel branch when a set signal is active, such that the power switches of the interleaved parallel branches that are turned on remain to be turned on;
    b) a plurality of phase overlap circuits configured to generate an active phase overlap trigger signal after detecting that the on-time of the power switch of any interleaved parallel branch is greater than a predetermined time threshold; and
    c) a plurality of logic circuits, each of which corresponds to one interleaved parallel branch, and being configured to control the power switch of the corresponding interleaved parallel branch to be turned on after receiving the active phase overlap trigger signal.

9. The control circuit of claim 8, wherein the control circuit is further configured to control the conduction phases of the power switches of the interleaved parallel branches not to be overlapped when the switching converter operates in a steady state, in order to reduce ripple.

10. The control circuit of claim 8, comprising a set signal generating circuit configured to obtain a compensation signal and a ripple signal, and generate the set signal by comparing the compensation signal and the ripple signal, wherein the compensation signal is configured to characterize a difference between an output voltage of the switching converter and an expected value of the output voltage, and the ripple signal is obtained in accordance with the output voltage and voltages at intermediate nodes of each of the interleaved parallel branches.

11. The control circuit of claim 10, further comprising a phase distribution circuit configured to control the power switches corresponding to the plurality of interleaved parallel branches to be turned on in a predetermined order in accordance with the set signal.

12. The control circuit of claim 10, further comprising:
    a) a master on-time control circuit configured to control on-time of the power switch of a master interleaved parallel branch to be a constant time in a steady state; and
    b) a plurality of slave on-time control circuits, corresponding to each slave interleaved parallel branch, and configured to control on-time of the power switches of each slave interleaved parallel branch in accordance with difference between an inductor current of each slave interleaved parallel branch and an inductor current of the master interleaved parallel branch correspondingly.

13. The control circuit of claim 8, wherein the shield circuit is configured not to shield when the set signal is inactive.

14. The control circuit of claim 8, wherein each interleaved parallel branch is a buck topology.

15. The switching converter of claim 14, wherein each interleaved parallel branch is a boost topology.

16. The switching converter of claim 14, wherein each interleaved parallel branch is a buck-boost topology.

* * * * *